United States Patent
Haimer et al.

(10) Patent No.: US 11,517,986 B2
(45) Date of Patent: Dec. 6, 2022

(54) ADAPTER FOR A COLLET CHUCK, COMPRISING A MOUNTING

(71) Applicant: Haimer GmbH, Hollenbach-Igenhausen (DE)

(72) Inventors: Franz Haimer, Igenhausen (DE); Josef Haimer, Igenhausen (DE)

(73) Assignee: Haimer GmbH, Hollenbach-Igenhausen (DE)

( * ) Notice: Subject to any disclaimer, the term of this patent is extended or adjusted under 35 U.S.C. 154(b) by 332 days.

(21) Appl. No.: 16/124,593

(22) Filed: Sep. 7, 2018

(65) Prior Publication Data
US 2019/0070698 A1    Mar. 7, 2019

(30) Foreign Application Priority Data
Sep. 7, 2017    (DE) .................... 10 2017 215 837.9

(51) Int. Cl.
*B23P 11/02*    (2006.01)
*B23B 31/20*    (2006.01)
*H05B 6/14*    (2006.01)

(52) U.S. Cl.
CPC ............ *B23P 11/027* (2013.01); *B23B 31/20* (2013.01); *H05B 6/14* (2013.01); *B23B 2231/04* (2013.01); *B23B 2240/28* (2013.01); *H05B 2206/022* (2013.01)

(58) Field of Classification Search
CPC . B23B 2231/04; B23B 2240/28; B23B 31/20; B23P 11/027; H05B 2206/022; H05B 6/14
USPC ........................................ 219/607, 635, 643
See application file for complete search history.

(56) References Cited

U.S. PATENT DOCUMENTS

| 6,680,466 | B2 | 1/2004 | Rabe |
| 7,278,194 | B2 | 10/2007 | Pfau |
| 2004/0080089 | A1* | 4/2004 | Haimer ................. B23P 11/027 269/58 |

(Continued)

FOREIGN PATENT DOCUMENTS

| DE | 10015074 | 8/2001 |
| DE | 10131352 | 1/2003 |

(Continued)

OTHER PUBLICATIONS

German Application No. 10 2017 215 837.9, German Search Report dated Jul. 18, 2018, 9 pages.

*Primary Examiner* — Dana Ross
*Assistant Examiner* — Joe E Mills, Jr.
(74) *Attorney, Agent, or Firm* — Kilpatrick Townsend & Stockton LLP

(57) ABSTRACT

A device for heating adapters for mounting tools for use in machine tools. The device comprises a base part in which an adapter for inserting or removing a tool is arranged such that the insertion direction of the tool extends towards the base part. The device also comprises a heating part designed for heating the adapter arranged in the base part, the base part and the heating part being displaceable relative to one another in the insertion direction of the tool. The base part comprises a mounting device for retaining the adapter in a fixed manner on the base part during heating. The adapter and the mounting device are provided with elements for interlocking interaction for retaining the adapter on the base part.

30 Claims, 4 Drawing Sheets

(56) References Cited

U.S. PATENT DOCUMENTS

| | | | | |
|---|---|---|---|---|
| 2006/0049180 A1* | 3/2006 | Haimer | ............. | B23Q 17/0923 |
| | | | | 219/635 |
| 2009/0152823 A1* | 6/2009 | Bernhardt | ............... | B23B 31/16 |
| | | | | 279/43 |
| 2010/0303572 A1* | 12/2010 | Sturm | ................... | B23B 29/046 |
| | | | | 409/234 |
| 2011/0284525 A1* | 11/2011 | Haimer | ................ | B23P 11/027 |
| | | | | 219/635 |
| 2016/0001359 A1* | 1/2016 | Voglewede | ............ | B22D 23/06 |
| | | | | 164/4.1 |
| 2016/0107284 A1* | 4/2016 | Haimer | ............. | B23Q 11/1023 |
| | | | | 407/11 |
| 2017/0036275 A1* | 2/2017 | Haimer | ............... | F16H 25/2223 |
| 2019/0162419 A1* | 5/2019 | Neukamm | ........... | H05B 6/1245 |

FOREIGN PATENT DOCUMENTS

| | | |
|---|---|---|
| DE | 10218292 A1 | 11/2003 |
| DE | 10349241 | 7/2005 |
| DE | 202004013916 U1 | 1/2006 |
| DE | 102007044097 | 3/2009 |
| EP | 2305407 A1 | 4/2011 |
| WO | 2004091847 | 10/2004 |

* cited by examiner

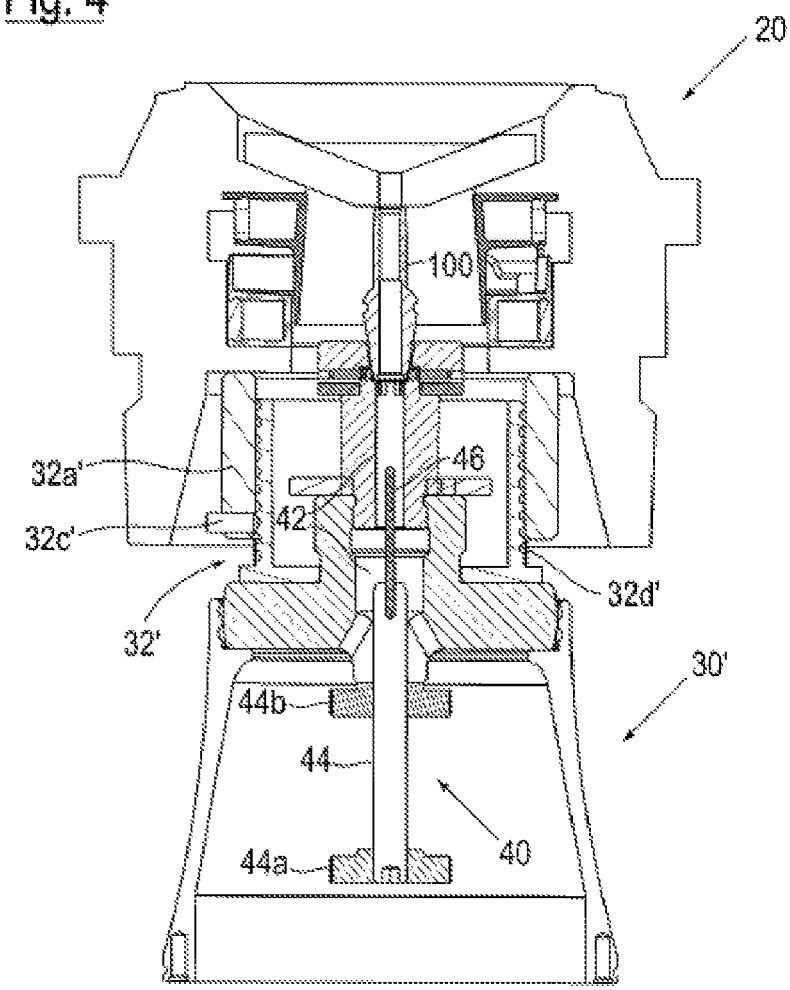

ADAPTER FOR A COLLET CHUCK, COMPRISING A MOUNTING

CROSS REFERENCE TO RELATED APPLICATION

This application claims priority to German Patent Application No. 10 2017 215 837.9, filed in Germany on Sep. 7, 2017, the entire contents of which are hereby incorporated herein by this reference.

The present invention relates to a device for heating adapters for mounting tools for use in machine tools, comprising a base part in which an adapter for inserting or removing the tool can be arranged such that the insertion direction of the tool extends towards the base part, and a heating part which is designed for heating the adapter arranged in the base part, the base part and the heating part being displaceable relative to one another in the insertion direction of the tool.

Collet chucks are still widely used today for mounting tools in machine tools. A female taper is provided in said collet chucks, which taper is adapted to the shape of the collet that receives the tool. When assembling the tool in the collet chuck, the collet is pressed into the female taper of the chuck by means of tightening a union nut, in this case slots provided in the periphery of the collet being compressed and the tool being firmly clamped in the collet chuck by means of this internally acting radial pressure.

However, since such assembly of a collet is associated with various disadvantages, for example the mentioned slots resulting in asymmetrical application of force in the collet, shrink fit chucks have recently become widespread in the market. The dimensions of shrink fit chucks of this kind in principle already allow for firm clamping of the tool, said chucks being heated significantly in order for the tool to be inserted, and expanding on account of the thermal expansion of the material thereof to such an extent that the tool can be inserted therein. Following a subsequent cooling procedure, the tool then rests tightly against the inner wall of the shrink fit chuck and is retained by the shrink fit chuck in a completely symmetrical manner.

In order that existing plants and machine tools can continue to be used with collet chucks and that use can simultaneously be made of the mentioned advantages of shrink fit chucks, adapters have been introduced to the market, the external shape of which in principle corresponds to that of a collet, such that said adapters can then be inserted into collet chucks in a manner similar to collets and mount the tool there. However, adapters of this kind are less easy to handle than a complete shrink fit chuck during the heating process intended for inserting or removing the tool, referred to as the shrinking process for contracting or shrinking the tool. However, heating the adapter while it is received in a collet chuck is technically almost impossible, and therefore the adapter has to be handled separately. However, the small axial height thereof and the low mechanical stability thereof impede this process.

In this connection, a device for heating adapters of this kind is known, in which said adapters are placed in a kind of substitute shrink fit chuck but in the process are not prevented from rotation or other movements. However, the shrinking processes carried out by said known device are disadvantageous in that, when the tool is to be removed again from the heated adapter, said tool may jam or not be removable in a frictionless manner for other reasons, for example in the case of contamination or the substitute shrink fit chuck inadvertently also being heated.

Furthermore, the substitute shrink fit chuck must also be heated together with the adapter, resulting in significant additional energy and time expenditure. Finally, the geometry of the adapter is restricted in the method described, since the additional application of energy for also heating the substitute chuck results in adapters comprising thin-walled portions being exposed to too great a thermal stress, and therefore a not insignificant minimum wall thickness must be adhered to in all regions of the adapter.

In order to overcome the mentioned disadvantages of generic devices, in the case of the device according to the invention, the base part comprises a mounting device that is designed for retaining the adapter in a fixed manner on the base part during heating.

Since corresponding adapters are generally cylindrically symmetrical, it is not essential for the mounting device to also fixedly retain said adapters on the base part with respect to the angular alignment thereof, although this may also be desirable, and therefore, in the present application, the expression "retain in a fixed manner" refers at least to a fixed spatial alignment, and optionally also to a fixed angular alignment between the base part and the retained adapter.

In principle, any suitable heating devices can be used in the heating part for heating the adapter, for example heat guns or the like. However, in a preferred embodiment, at least one induction coil is provided in the heating part, which coil is designed to generate alternating electromagnetic fields in the interior thereof in which the retained adapter is arranged during operation of the device according to the invention, i.e. when a shrinking process is being carried out, which fields in turn induce eddy currents in the adapter, by means of which said adapter is heating owing to the ohmic resistance thereof. Of course, adapters of this kind must accordingly be made of materials that must also allow said adapters to be heated in an inductive manner, in addition to meeting the conventional requirements for thermal and mechanical stability.

In contrast, it may be advantageous for the mounting device in the device according to the invention to be made of electrically and/or magnetically weakly conductive or non-conductive material. These measures keep low both the magnetic shielding effect of the mounting device and the heating of said device itself during inductive heating of the adapter. Specifically, it is conceivable for the mounting device to be manufactured completely or in part from stainless steel or aluminium, or from suitable plastics materials.

In order to be able to ensure that the adapter is securely retained by the mounting device in particular in the radial direction of the adapter, the mounting device may be designed to enclose said adapter over the entire periphery thereof, in portions, when retaining the adapter. As a result, jamming or tilting of the adapter while it is retained by the mounting device can be reliably prevented.

In order to nonetheless be able to ensure sufficient heating of the enclosed portion of the adapter in the case of the adapter being enclosed over the entire periphery thereof by the mounting device and the associated shielding of the adapter from the alternating field of the induction coil, the mounting device may comprise one or more apertures in the portion thereof that encloses the entire periphery of the adapter, in which apertures magnetisable elements extend towards the retained adapter. In this case, it is conceivable specifically, for example, for an element made of ferrite iron or a similar material that is weakly electrically conductive but highly magnetically conductive to be provided in the region of the mounting device, which element encloses the entire mounting device and engages in or protrudes into the apertures thereof.

In this case, the dimensions of said ferrite element can preferably be such that the portions thereof engaging in the apertures reach as far as the immediate vicinity of the outer periphery of the adapter. Therefore, just a narrow gap remains between the ferrite element and the retained adapter, as a result of which the region of the adapter enclosed by the mounting device is also exposed to a large magnetic flux for the purpose of the heating thereof. This development of the invention is advantageous in particular when the adapter is relatively short and, when inserted, the tool extends almost as far as the lower end of the adapter. In this case it is important to heat the adapter over almost the entire length thereof to such an extent as to make it possible to easily introduce the tool therein.

Since it may be desirable for different types of adapters to be able to undergo a shrinking process in just one device according to the invention, when specifically positioning the heating part relative to the adapter it may be advantageous for the heating part to furthermore comprise a stop portion that is designed to come into contact with the retained adapter at a specified relative position of the heating part with respect to the base part, during displacement of the heating part relative to the base part. In particular, this may be a position in which the adapter is optimally exposed to the alternating electromagnetic field of the at least one induction coil, in order to achieve the greatest possible efficiency in the shrinking process. Since, in this manner, the position of the heating part relative to the base part can be fixed by means of the contact between the stop portion of the heating part and the adapter, suitable positioning of the stop portion on the heating part can ensure that, following displacement of the heating part relative to the base part, the induction coils are always in a position in which differently designed adapters of different lengths can also be optimally exposed to the alternating field of said coils.

In order to be able to repeatedly assume said optimal position quickly, as soon as it has been fixed using the stop portion, a positioning means may furthermore be assigned to the base part, which means is designed to move relative to the mounting device when the heating part is displaced with respect to the base part, to be lockable with respect to the base part, and to form a stop for the heating part in the corresponding relative position with respect to the base part in the locked state. As a result, during operation of the device according to the invention, in order to carry out a shrinking process of an adapter, the heating part can first be displaced into an optimal position using the stop portion, moving the positioning means with respect to the base part, and when said position has been reached the positioning means being able to be locked and the heating part being able to be removed again, for example in order to insert a second, structurally identical adapter into the mounting device, and the heating part then being able to be displaced back into the corresponding position, where said part again comes into contact with the positioning means. Additionally providing the positioning means is advantageous for example if the stop portion of the heating part is to be removed during operation thereof, in order that, in the example cited of two shrinking processes of two identically designed adapters, said stop part does not need to be reattached to the heating part between said two processes.

In a development, the device according to the invention may further comprise a cooling part that is designed to cool the adapter arranged in the base part and to be displaceable with respect to the base part in the insertion direction of the tool. As a result, following a shrinking process and insertion of the tool into the adapter, the heating part can be removed from the base part and replaced by the cooling part, resulting in accelerated cooling of the adapter in order that said adapter can be quickly inserted in the machine tool for which it is intended. Additionally providing a cooling part thus reduces the cycle times required for the entire process of inserting a tool into an adapter.

In a second aspect, the present invention relates to a system formed of a device according to the invention for heating adapters for mounting tools for use in machine tools and an adapter of this kind for mounting tools for use in machine tools, the tool extending out of the adapter on one side when mounted, the adapter preferably having the outer dimensions of a collet.

Even though the retaining interaction between the adapter and the mounting device can in principle be achieved using any suitable means, it may be advantageous for the adapter and the mounting device to each be provided with elements for interlocking interaction for retaining the adapter on the base part, for example interacting threaded portions or contouring or a slotted guide system.

In this case, it may furthermore be advantageous for the adapter and the mounting device to have complementary dimensions in the region of the interlocking interaction, for example to be formed as a truncated female and male taper, respectively. An embodiment is conceivable in particular in which the adapter comprises a preferably multi-start, in particular double-start, external thread in a frustoconically tapering end portion on the end thereof that is to be inserted into the mounting device, and the mounting device comprises a likewise frustoconically tapering opening having a planar base, on the inner wall of which at least one blocking element is formed that can be brought into engagement with the external thread of the adapter.

The frustoconical design of the end portion of the adapter and a large pitch of the thread mean that the adapter can be screwed into and thus fastened to the mounting device by means of a very short screwing movement, for example of less than half or even a quarter of a rotation. In this way, the adapter can be assembled on the mounting device in an accurately repeatable manner, and extremely precise repeatable positioning in the axial direction, which likewise allows for length adjustment of the tool, is achieved by the adapter being pressed onto the base of the frustoconical opening at the end of the screwing movement. In this case, a tolerance of less than 0.01 mm, or even 0.005 mm, can be achieved by means of a suitable design of the mounting device and of the adapter. For this purpose, the adapter can additionally comprise a planed support surface on the lower face thereof, which surface is located, on the frustoconical outer face thereof, so as to be at a sufficiently precisely defined position, in the axial direction, with respect to a reference diameter. If a tool having a specified projection length out of the adapter or having a specified length relative to a reference surface on the adapter is shrunk into the adapter on the device according to the invention, the overall length of the module formed by the combination of the adapter and tool in a receiving portion can thus be precisely specified in advance.

As already mentioned above, the calibration according to the invention of the device for heating the adapter and of the adapter itself allows for significantly more flexibility when shaping the adapter, since said adapter can be heated in a substantially more selective manner and therefore thin-walled regions can also be provided without the risk of the adapter being damaged during shrinking processes. It may in particular be advantageous in this case for the adapter to comprise a thin-walled portion that protrudes beyond an outer conical region of the adapter and surrounds the tool extending out of the adapter. In this way, the adapter length in contact with the tool is increased, and therefore the tool as a whole can be mounted more firmly and more precisely on the adapter, both in the radial and in the axial direction. In a variant, the thin-walled portion may protrude beyond the outer conical region of the adapter to such an extent that, when inserted, the tool is located only in the region of the thin-walled portion and no longer protrudes into the outer conical region of the adapter.

In a development, the system according to the invention may comprise a plurality of adapters which comprise identical elements for interlocking interaction with the mounting device and differ in their outer dimensions. In this way, it is possible for various types of adapters to undergo shrinking processes in just one device for heating, thus once again significantly increasing the flexibility of the system as a whole. In this case, it is necessary merely to ensure that all the adapters can be retained by the mounting device of the device in a suitable manner.

In a further development, the system according to the invention may additionally comprise a collet chuck for use in a machine tool, which chuck is designed to receive the adapter or one of the adapters and is optionally formed such that, in the received state thereof, the thin-walled portion of the adapter protrudes beyond the collet chuck in the axial direction. Furthermore, the collet chuck may be designed to selectively receive at least one of the adapters or a collet.

The present invention further relates to an adapter for a system according to the invention, which adapter has a cylindrical outer contour in portions, which contour is provided in the axial direction between a first and a second portion that each have a conical outer contour. In this case, said adapter can be formed such that the outer contour that is cylindrical in portions has an outer diameter that is greater than that of the first portion having the conical outer contour and smaller than that of the second portion having the conical outer contour.

Alternatively or in addition, the adapter may comprise an external thread, preferably a multi-start external thread, which may be designed so as to have a conical outer contour in a first portion. In this case, a contact surface may be formed between the thread turns in the first portion having the conical outer contour, which contact surface is wider than half the groove width of one thread turn. Furthermore, the adapter according to the invention may be free of axial slots.

In a development, the adapter may comprise at least one, preferably four, groove(s) that are open towards the tool, and/or at least one channel for guiding coolant. In this case, the at least one groove and/or the at least one channel may extend substantially in the axial direction, so as to be able to obtain the coolant from behind the tool and guide said coolant around the tool. In this connection, a channel denotes a path for coolant that is completely enclosed by the body of the adapter, whereas a groove is open towards the tool.

Furthermore, the present invention relates to a method for inserting a tool into an adapter or for removing a tool from an adapter of a system according to the invention, said method comprising the steps of:

retaining the adapter in the mounting device;
displacing the heating part with respect to the base part until the adapter is located in a heating region of the heating part, for example in a field region of the at least one induction coil of the heating part;
operating the heating part in order to heat and expand the adapter,
inserting the tool into the adapter or removing the tool from the adapter,
optionally cooling the adapter such that the adapter shrinks and firmly encloses the tool, and
removing the adapter from the mounting device.

In this case, the last two steps of cooling and removing the adapter can also be provided in the reverse order, such that the mounting device is immediately available for retaining a further adapter.

Finally, it should also be noted that protection is also separately sought for the base part for use in a device according to the invention.

Further features and advantages of the present invention will become clear from the following description of an embodiment, when considered together with the accompanying drawings, in which, in detail:

FIG. 4 shows a modified variant of the device from FIG. 1.

Figure 1:
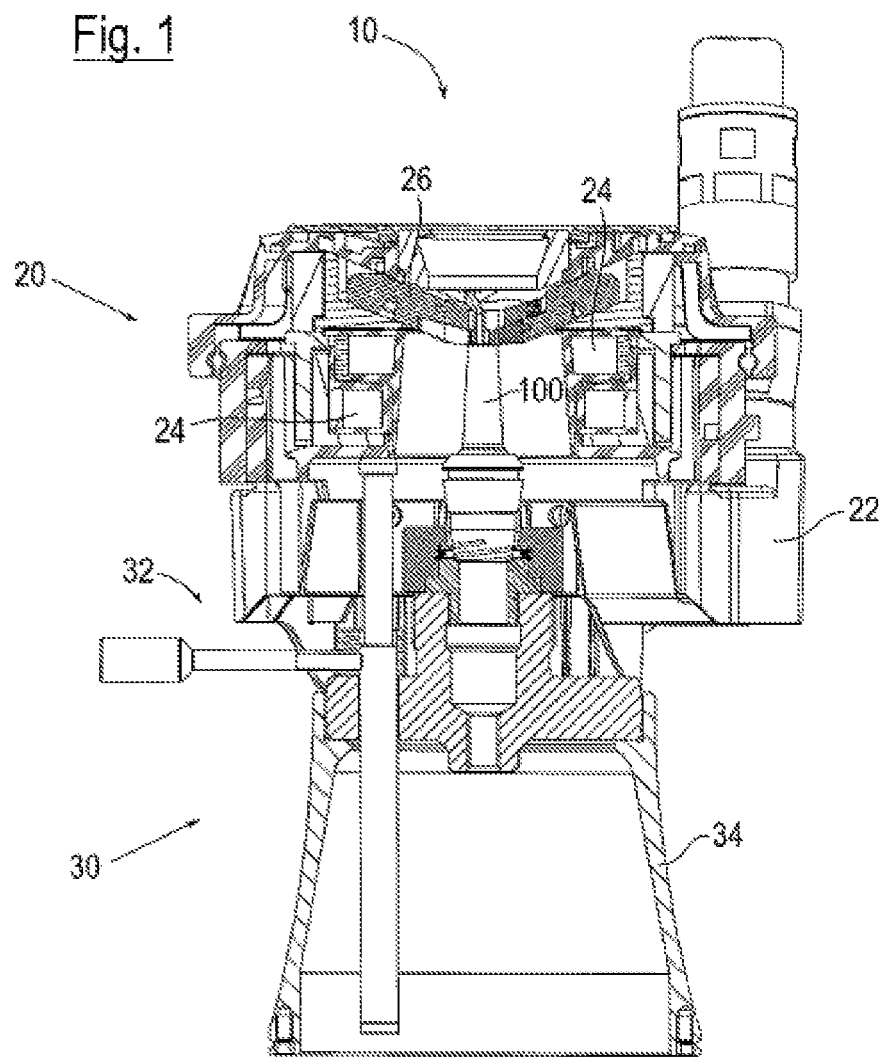
FIG. 1 is a schematic cross section of a device according to the invention.

FIG. 1 is a schematic cross section of a device according to the invention for heating adapters for holding tools for use in machine tools, which device is denoted very generally by reference sign 10. The device 10 comprises two essential parts, specifically the heating part 20 shown at the top in FIG. 1 and the base part 30 shown at the bottom. FIG. 1 furthermore shows an adapter 100 that is retained on the base part and extends upwards from the base part 30 into the heating part 20.

The heating part 20 and the base part 30 can be displaced relative to one another, in particular in the direction specified by the extension of the adapter 100 in the axial direction thereof, described in more detail below, and in which a tool (not shown in the figures) can be inserted into the adapter. For this purpose, the heating part 20 can for example be displaceably fastened to a frame which is fixed relative to the base part 30.

For this purpose, the heating part 20 comprises a housing 22 in which a pair of induction coils 24 is arranged, which coils are supported in cavities in the housing 22. In the drawing in FIG. 1, the axes of said induction coils 24 also extend in the vertical direction, such that the axes of the induction coils 24 extend in parallel with the axis of the adapter 100. The induction coils are supplied with power by means of electrical supply lines (not shown) and are operated such that the alternating fields generated thereby induce currents in the adapter 100.

The heating part 20 further comprises a stop element 26, the upper face of which is in contact with the adapter 100 in the position shown in FIG. 1. In the case of vertical displacement of the heating part 20 downwards towards the base part 30, said stop element 26 ensures that said displacement ends at a suitable relative position of the heating part 20 with respect to the adapter 100 and thus to the base part 30. In this suitable position shown in FIG. 1, the induction coils 24 are positioned with respect to the adapter 100 such that, when operated by means of an alternating current, currents are likewise induced in the adapter 100 by means of electromagnetic interaction, which currents heat the adapter 100 on account of the ohmic resistance thereof. The resulting thermal expansion then expands the adapter 100 such that the provided tool can finally be inserted therein.

The stop element 26 shown is a component that could also be used together with the heating part 20 shown here when inductively heating larger components than the adapter 100, said stop element primarily being used in such cases in order to concentrate the magnetic field at the end face of the corresponding component. However, a concentration of this kind is not desirable when an adapter 100 is present, on account of the thin-walled design of said adapter, since magnetic field strengths that are too great could result in damage to the adapter 100. Accordingly, the stop element 26 is removed from the heating part 20 prior to operation of the induction coils 24, or is moved into a position inside the heating part 20 in which it can no longer have any effect on the adapter 100.

In order that it is not necessary to move the stop element 26 closer to the adapter 100 again when the heating part 20 is displaced again with respect to the base part 30 when using the same or a structurally identical adapter 100, the base part 30 comprises a positioning means 32.

Figure 2:
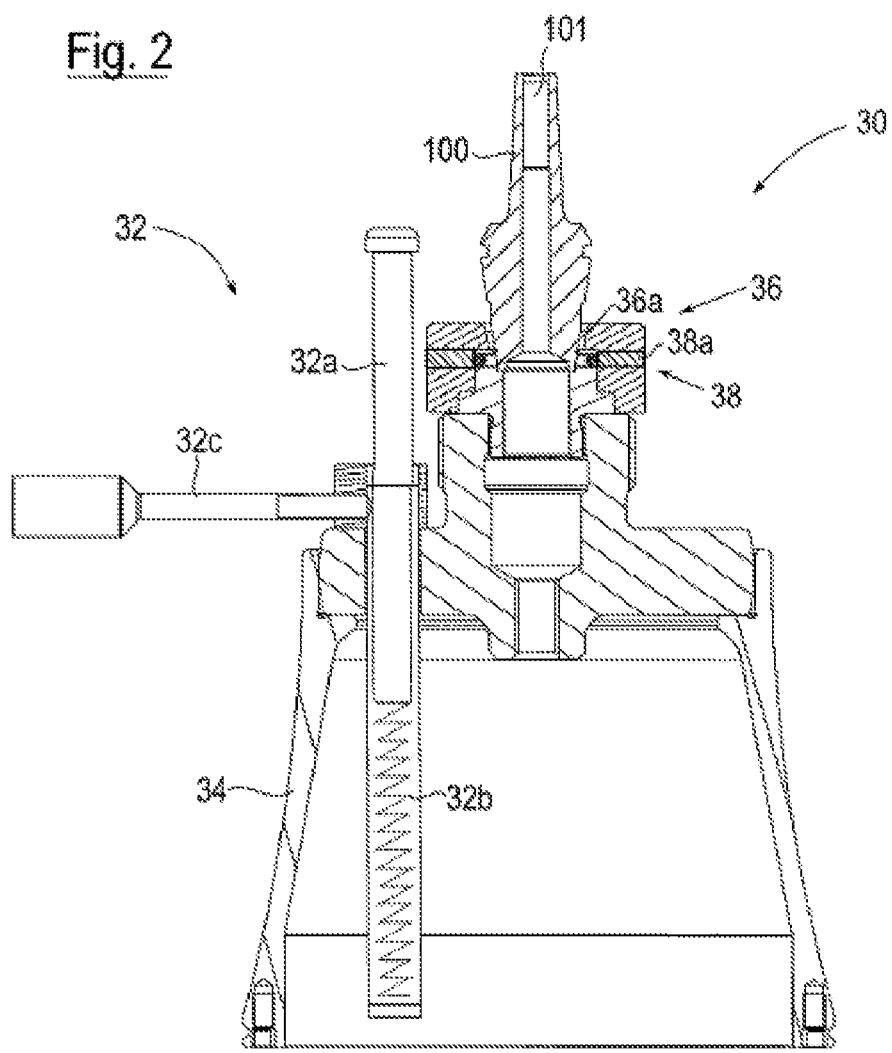
FIG. 2 is an enlarged cross section of the base part of the device from FIG. 1.

Said positioning means 32 can be clearly seen in particular in the enlarged view of the base part 30 in FIG. 2. Said means comprises a telescopically extensible tube assembly 32a comprising a fixed outer tube and a displaceable inner tube which is preloaded upwards in the vertical direction by means of a spring 32b received in the outer tube.

When the heating part 20 is placed on the base part 30, a portion of the housing 22 of the heating part 20 comes into contact with the inner tube, such that the tube assembly 32a is compressed counter to the action of the spring 32b, it being possible, upon reaching a suitable relative position between the heating part 20 and the base part 30, for example the position shown in FIG. 1, for the positioning means to then be fixed in this position by means of a lever 32c. It is thus possible for the optimum position, identified using said contact element 26, to also be assumed again after the stop element 26 has been removed from the heating part 20, in that the heating part 20 is lowered relative to the base part 30 until the housing 22 of the heating part 20 again comes to rest on the positioning means 32.

The base part 30 furthermore comprises a pedestal 34 on which a mounting device 36 is arranged. Said mounting device 36 substantially consists of a frustoconical receiving portion 36a that comprises a planar base and is provided with suitable engagement elements, for example an internal thread or projections carrying out the same function, by means of which elements the external thread 102 (described later) of the adapter 100 can be screwed in. The mounting device 36 encloses the lower portion 104 of the adapter 100 over the entire periphery thereof and therefore acts as a shield against the magnetic field generated by the coils 24, with the result that heating of the portion of the adapter 100 received in the mounting device is initially inhibited. In order to compensate for said shielding effect, apertures 38 are provided in the mounting device 36, through which apertures ferrite elements 38a extend inwardly from the outside, towards the adapter 100. Said ferrite elements 38a conduct and concentrate the external magnetic field through the mounting device 36 as far as the adapter 100, such that the lower portion 104 of said adapter is also heated and expanded.

If the adapter 100 has been sufficiently heated and therefore expanded, a provided tool having suitable dimensions can then be inserted from above into the interior 101 (shown only here) of the tool 100, where said tool remains clamped after the adapter has been cooled again.

Figure 3A:
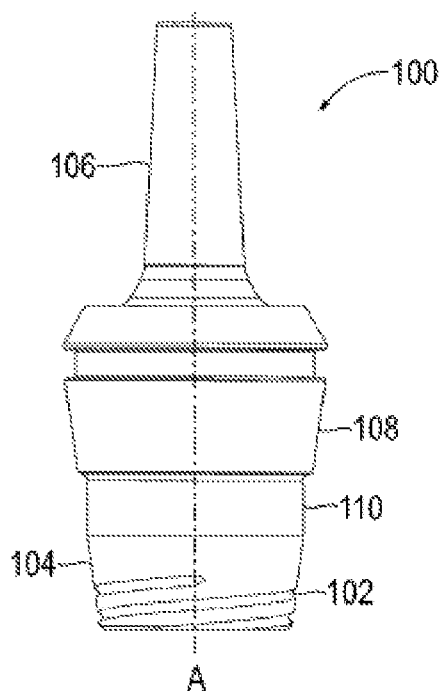
FIG. 3a is a side view of a first design of an adapter according to the invention.
Figure 3B:
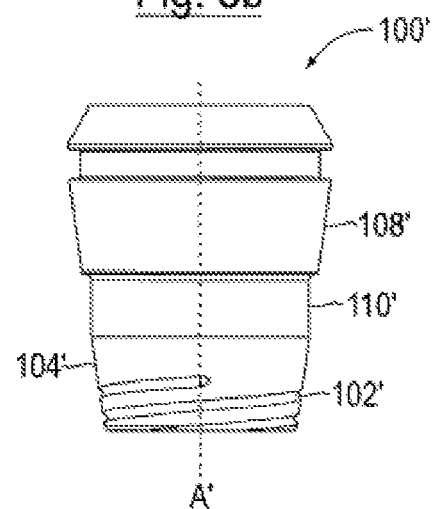
FIGS. 3b and 3c are a side view and an oblique plan view of a second design of an adapter according to the invention.
Figure 3C:
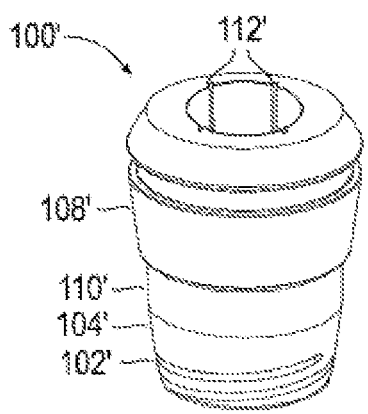
Figure 3D:
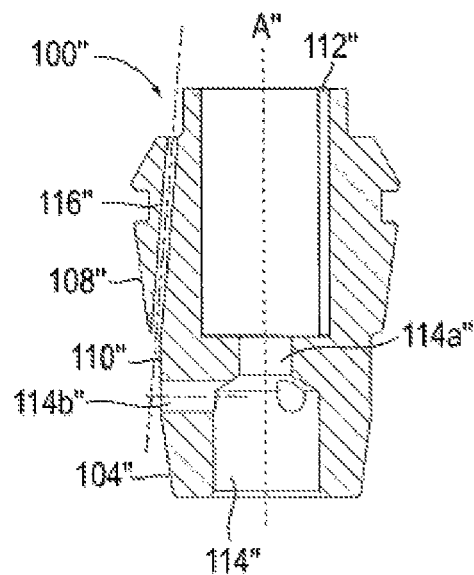
FIG. 3d shows a third design of an adapter according to the invention.

Furthermore, three embodiments of adapters will be described with reference to FIG. 3a to 3d, which adapters can undergo a shrinking process in the device 10 from FIG. 1. In this case, FIGS. 3a and 3b are side views of the first and the second embodiment, respectively, FIG. 3c is an oblique plan view of the second embodiment, and FIG. 3d is a cross section of the third embodiment.

Firstly, FIG. 3a again shows the adapter 100 from FIGS. 1 and 2. In this case, the adapter 100 has an axis A along which the mentioned tool can be inserted into said adapter and about which said adapter is substantially rotationally symmetrical.

Only at the face thereof shown at the bottom in FIGS. 1 and 2, i.e. on the face remote from the emergence of the tool, is said symmetry interrupted by the already mentioned external thread 102 being provided in the outer wall of the adapter 100. As explained above, the adapter 100 can be screwed into the mounting device 36 of the base part 30 by means of the external thread 102, the frustoconical shape of the corresponding lower portion 104 of the adapter 100 and the complementary shape of the receiving portion 36a, as well as the high pitch of the thread 102, making it possible to achieve highly precise positioning of the adapter 100 in the mounting device 36.

The adapter 100 furthermore has an outer shape that allows it to be used in conventional collet chucks; in particular, a large portion of the extension of said adapter is likewise frustoconical along the axis A thereof, such that said adapter can be screwed into a collet chuck by means of a union nut. The adapter 100 comprises a thin-walled extension portion 106 only at the upper face thereof facing the emergence of the tool, which portion closely surrounds the tool received in the adapter 100. As a result, the tool is more securely mounted in the adapter 100, both in the radial and in the axial direction, compared with conventional chucks and known adapters, thus further increasing the precision of the module formed of the adapter 100 and the tool (not shown). In a variant, however, the extension portion 106 may also be of such a length that the tool is mounted merely within the extension portion 106 and no longer protrudes into the frustoconical portion 104 of the adapter 100.

The variant 100' of an adapter shown in FIGS. 3b and 3c shows that it is, however, also possible to omit said portion 106 in adapters according to the invention, said variant not comprising a portion of this kind, the outer shape of the adapter 100' being otherwise identical to the adapter 100 from FIG. 3a. In particular, the frustoconical portion 104' has the same outer dimensions and the external thread 102' has the same pitch as in the case of the adapter 100 from FIG. 3a. Since said parameters are the same in differently shaped adapters 100 and 100', said adapters can each be screwed into the mounting device 36 of the device 10 from FIGS. 1 and 2 in the same manner and can undergo a shrinking process therein.

It should furthermore be noted that the two embodiments of an adapter 100 and 100' according to the invention have an outer contour 110 and 110', respectively, that is cylindrical in portions and that is provided in the axial direction between the frustoconical portion 104 and 104', respectively, and a further frustoconical portion 108 and 108', respectively. In this case, the outer diameter of the cylindrical outer contour 110 and 110', respectively is in each case greater than that of the frustoconical portion 104 and 104', respectively, and smaller than that of the further frustoconical portion 108 and 108', respectively.

A further difference between the embodiments 100 and 100' from FIGS. 3a, 3b and 3c is that the embodiment 100' comprises four grooves 112', spaced apart by 90° in each case, on the inner face thereof facing the tool, which grooves are open towards the tool and through which grooves coolant can thus be guided along the tool. Since said coolant is fed into a machine tool from the lower face in FIGS. 3b and 3c, i.e. the face of a mandrel, both the adapter 100' and in particular the tool can be cooled thereby, and coolant can be transported into the region in which an object is machined by the tool.

This supply of coolant can be understood in particular with reference to the third embodiment of an adapter 100" according to the invention, shown in FIG. 3d, in which, in addition to the at least one groove 112" already mentioned, a channel 116" is furthermore provided, which channel extends through the body of the adapter at an angle to the axis A". Otherwise, in particular with respect to the outer dimensions thereof, the third embodiment 110" corresponds to the second embodiment 110' and comprises, just like said second embodiment, to frustoconical portions 104" and 108" and a cylindrical portion 110" arranged therebetween. It should merely be noted that, for the sake of clarity, the first frustoconical portion 104" of the adapter 110" is shown without an external thread, although said thread may also be provided.

As already mentioned, coolant is fed into the part of the adapter 110" at the bottom in FIG. 3d through an access point 114", which coolant then flows through the first flow path 114a", to the groove 112", and in said groove along the tool, and also flows through the second flow path 114b" and along the outer face of the cylindrical portion 110", in the channel 116", in order to finally also flow towards the tool radially from the outside. In this case, it should be reiterated that the adapter 100" is received in a chuck during operation, which chuck is located radially outside the cylindrical portion 110" and guides the coolant, together therewith, between the second flow path 114b" and the channel 116".

Finally, FIG. 4 shows a modified variant of the device from FIG. 1, which variant differs from FIG. 1 both by the shaping of the positioning means thereof, which means is denoted here by reference sign 32', and by a length adjustment assembly 40 being provided for the tool that is to be inserted into the adapter. It should be noted that said length adjustment assembly 40 can in principle also be combined with the base part 30 from FIGS. 1 and 2, and that the heating part 20 and the mounting device 36 from FIGS. 1 and 2 are used in the variant in FIG. 4.

Therefore, for reasons of clarity, said heating part 20 and said mounting device 36, as well as further components that are also present in the same or a similar form in the device from FIG. 1, will not be described again, and reference is made to the corresponding passages above in which said components are described.

The positioning means 32' comprises an annular element 32a' which extends around an upper region of the base part 30' and functions, in a manner similar to the tube assembly 32a of the positioning means 32 from FIGS. 1 and 2, as a height-adjustable support for the heating part 20. The annular element 32a' can likewise be displaced with respect to the base part 30' towards the axis of the adapter 100 by means of the action of the heating part 20 that is moved towards the base part 30' or manually. In order to fix the annular element 32a' in a position that corresponds to a position of the heating part 20 suitable for the adapter 100 currently retained in the base part 30', a bolt 32c' is furthermore provided, which bolt can be inserted into a hole in the annular element 32a' and engages, on the axial inner face of the annular element 32a', with one of a series of grooves 32d' on the base part 30'. Since the bolt 32c' is wedged between the annular element 32a' and the corresponding groove 32d', the annular element is fixed in the current spatial and angular position thereof and can function as a stop for the heating part 20.

Finally, the length adjustment assembly 40 for the tool that is to be inserted into the adapter will be explained. Said assembly comprises a hollow portion 42 which is at the bottom in the extension of the axis of the adapter 100 and extends as far as the lower opening of the adapter 100. A tube 44 is displaceably guided in the hollow portion, which tube comprises an actuation portion 44a at the lower end thereof for displacing the tube 44 in the hollow portion 42. Furthermore, a stop 44b is provided on the base part 30', which stop limits the displacement of the tube 44 in the hollow portion 42.

A rod 46 is furthermore retained at the upper end of the tube 44, which rod has a reduced diameter, in particular a diameter that is smaller than the inner diameter of the adapter 100 when shrunk or, in other words, smaller than the diameter of the tool that is received in the adapter 100. When the tube 44 is displaced upwards, after a particular point in time, the rod 46 will be located inside the adapter in part. Here, said rod consequently functions as a vertical stop for a tool that is to be inserted into the adapter 100 from above, the diameter of said rod being, as mentioned, sufficiently small that it can be removed again from the interior of the adapter 100 from below without problem, even after the tool has been shrunk into the adapter 100. Since the rod 46 is thus inserted into the adapter, from below, to a specified extent before the tool is inserted and shrunk in, the position of the tool, and thus the projection thereof upwards, out of the adapter 100, can be adjusted very precisely.

The invention claimed is:

1. A device for heating adapters for mounting tools for use in machine tools, comprising:
    a base in which an adapter for inserting or removing a tool can be arranged such that the insertion direction of the tool extends towards the base; and
    a heating part designed for heating the adapter arranged in the base, the base and the heating part being displaceable relative to one another in the insertion direction of the tool, wherein the base comprises a mounting device that is designed for retaining the adapter in a fixed manner on the base during heating, and wherein a conical surface of the mounting device is provided with threaded elements for interlocking interaction with a conical threaded surface of the adapter for retaining the adapter on the base.

2. The device of claim 1, wherein the heating part comprises at least one induction coil that is designed to heat the adapter, arranged in the base by means of electromagnetic induction.

3. The device of claim 1, wherein the mounting device is made of a material that is at least one of electrically conductive or magnetically weakly conductive.

4. The device of claim 1, wherein the mounting device comprises one or more apertures in a portion thereof that encloses the entire periphery of the adapter, wherein magnetisable elements extend through the one or more apertures towards the retained adapter.

5. The device of claim 1, wherein the heating part further comprises a stop portion that is designed to come into contact with the retained adapter at a specified relative position of the heating part with respect to the base, during displacement of the heating part relative to the base, wherein a position of the heating part relative to the base is fixable by means of the contact of the stop portion and the retained adapter.

6. The device of claim 5, wherein a positioning means is further assigned to the base, wherein the positioning means is designed to move relative to the mounting device when the heating part is displaced with respect to the base to be lockable with respect to the base and to form a stop for the heating part in a corresponding relative position with respect to the base in a locked state.

7. A system comprising:
an adapter for mounting tools for use in machine tools, wherein the tool extends out of the adapter on one side when mounted; and
a device for heating said adapter, the device comprising:
a base in which the adapter is arranged such that an insertion direction of the tool extends towards the base, and
a heating part designed for heating the adapter arranged in the base, the base and the heating part being displaceable relative to one another in the insertion direction of the tool, wherein the base comprises a mounting device that is designed for retaining the adapter in a fixed manner on the base during heating, and wherein a conical surface of the mounting device is provided with threaded elements for interlocking interaction with a conical threaded surface of the adapter for retaining the adapter on the base.

8. The system of claim 7, wherein the adapter and the mounting device have complementary dimensions in a region of the interlocking interaction.

9. The system of claim 7, wherein the adapter comprises a thin-walled portion that surrounds the tool.

10. The system of claim 7, further comprising a collet chuck for use in a machine tool, wherein the collet chuck is designed to receive the adapter.

11. The system of claim 10, wherein the collet chuck is furthermore designed to selectively receive the adapter or a collet.

12. The system of claim 7, wherein the adapter has a cylindrical outer contour in portions, the outer contour being provided in an axial direction between a first portion and a second portion, wherein each of the first portion and the second portion has a conical outer contour.

13. The system of claim 12, wherein the outer contour has an outer diameter that is greater than that of the first portion having the conical outer contour and smaller than that of the second portion having the conical outer contour.

14. The system of claim 7, wherein the conical threaded surface of the adapter comprises an external thread.

15. The system of claim 14, wherein the external thread comprises a multi-start external thread.

16. The system of claim 12, wherein an external thread is formed in the first portion having the conical outer contour.

17. The system of claim 16, wherein a contact surface is formed between the thread turns in the first portion having the conical outer contour, which contact surface is wider than half a groove width of one thread turn.

18. The system of claim 12, wherein the adapter is free of axial slots.

19. The system of claim 12, wherein the adapter comprises at least one groove that is open towards the tool.

20. A method for inserting a tool into the adapter or for removing the tool from the adapter of the system of claim 7, comprising:
retaining the adapter in the mounting device by the threaded elements for interlocking action of claim 7;
displacing the heating part with respect to the base until the adapter is located in a heating region of the heating part;
operating the heating part in order to heat and expand the adapter;
inserting a tool into the adapter or removing the tool from the adapter; and
removing the adapter from the mounting device with the interlocking interaction released.

21. The device of claim 1, wherein the mounting device is made of a non-conductive material.

22. The system of claim 7, wherein the adapter has outer dimensions of a collet.

23. The system of claim 8, wherein the adapter and the mounting device are formed as a female and male taper, respectively.

24. The system of claim 10, wherein the collet chuck is formed such that, in a received state thereof, a thin-walled portion of the adapter protrudes beyond the collet chuck in the axial direction.

25. The adapter of claim 19, wherein the adapter comprises at least one channel for guiding coolant.

26. The method of claim 20, further comprising: cooling the adapter such that the adapter shrinks and firmly encloses the tool.

27. The method of claim 20, further comprising cooling the adapter prior to removing it from the mounting device.

28. A device for heating adapters for mounting tools for use in machine tools, comprising:
a base in which an adapter for inserting or removing a tool can be arranged such that the insertion direction of the tool extends towards the base; and
a heating part designed for heating the adapter arranged in the base, the base and the heating part being displaceable relative to one another in the insertion direction of the tool, wherein the base comprises a mounting device that is designed for retaining the adapter in a fixed manner on the base during heating, and wherein a conical surface of the mounting device is provided with threaded elements for interlocking interaction with a conical threaded surface of the adapter for retaining the adapter on the base, wherein the conical threaded surface of the adapter comprises an external thread provided on a frustoconical portion of the adapter.

29. A system comprising:
an adapter for mounting tools for use in machine tools, wherein the tool extends out of the adapter on one side when mounted; and
a device for heating said adapter, the device comprising:
a base in which the adapter is arranged such that an insertion direction of the tool extends towards the base, and
a heating part designed for heating the adapter arranged in the base, the base and the heating part being displaceable relative to one another in the insertion direction of the tool, wherein the base comprises a mounting device that is designed for retaining the adapter in a fixed manner on the base during heating, and wherein a conical surface of the mounting device are is provided with threaded elements for interlocking interaction with a conical threaded surface of the adapter for retaining the adapter on the base, wherein the conical threaded surface of the adapter comprises an external thread provided on a frustoconical portion of the adapter.

30. A method for inserting a tool into the adapter or for removing the tool from the adapter of the system of claim 29, comprising:
   retaining the adapter in the mounting device by the threaded elements for interlocking interaction of claim 29;
   displacing the heating part with respect to the base until the adapter is located in a heating region of the heating part;
   operating the heating part in order to heat and expand the adapter;
   inserting a tool into the adapter or removing the tool from the adapter; and
   removing the adapter from the mounting device with the interlocking interaction released.

* * * * *